United States Patent
Cha et al.

(10) Patent No.: US 11,142,081 B2
(45) Date of Patent: Oct. 12, 2021

(54) VEHICLE CONNECTED TO BUILDING AND VEHICLE-BUILDING CONNECTION SYSTEM

(71) Applicants: HYUNDAI MOTOR COMPANY, Seoul (KR); KIA MOTORS CORPORATION, Seoul (KR)

(72) Inventors: Dong Eun Cha, Hwaseong-si (KR); Jin Ho Hwang, Seoul (KR); Sang Heon Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 148 days.

(21) Appl. No.: 16/654,390

(22) Filed: Oct. 16, 2019

(65) Prior Publication Data
US 2020/0338994 A1    Oct. 29, 2020

(30) Foreign Application Priority Data

Apr. 23, 2019 (KR) .................. 10-2019-0047111

(51) Int. Cl.
*H02J 7/00* (2006.01)
*B60L 53/12* (2019.01)
*B60L 53/30* (2019.01)
*B60L 53/66* (2019.01)

(52) U.S. Cl.
CPC ............. *B60L 53/12* (2019.02); *B60L 53/305* (2019.02); *B60L 53/665* (2019.02)

(58) Field of Classification Search
CPC ............................. B60L 53/12; B60L 53/305

USPC ............................................................ 320/109
See application file for complete search history.

(56) References Cited

U.S. PATENT DOCUMENTS

| | | | | |
|---|---|---|---|---|
| 2018/0162259 | A1* | 6/2018 | Lin | .......................... B60P 3/39 |
| 2019/0004487 | A1* | 1/2019 | Yuzawa | ................. G06Q 30/04 |
| 2019/0302764 | A1* | 10/2019 | Smith | ................. G05D 1/0061 |
| 2020/0001733 | A1* | 1/2020 | Wieschemann | ....... H02J 7/0042 |
| 2020/0047623 | A1* | 2/2020 | Zadrozny | ................ B60L 53/38 |
| 2020/0164760 | A1* | 5/2020 | Sohmshetty | ............ B60L 53/36 |
| 2020/0276907 | A1* | 9/2020 | Lee | ............................ E04H 6/42 |

(Continued)

FOREIGN PATENT DOCUMENTS

| | | |
|---|---|---|
| JP | 2009-278776 A | 11/2009 |
| JP | 2010-203177 A | 9/2010 |

(Continued)

OTHER PUBLICATIONS

Korean Office Action dated Jun. 21, 2021 issued in Korean Patent Application No. 10-2019-0047111.

*Primary Examiner* — Suchin Parihar
(74) *Attorney, Agent, or Firm* — Morgan, Lewis & Bockius LLP (57) ABSTRACT

A vehicle connected to a building and a vehicle-building connection system are disclosed. The vehicle includes a door, a vehicle energy storage unit configured to supply driving energy of the vehicle, a vehicle energy connection unit configured to exchange energy between the building and the vehicle energy storage unit, a data connection unit configured to transmit and receive data to and from the building, and a vehicle controller configured to execute any one or more of a connection mode, an energy mode, or a data mode according to an access level with the building.

16 Claims, 6 Drawing Sheets

(56) References Cited

U.S. PATENT DOCUMENTS

2020/0324630 A1\* 10/2020 Cha ........................... E04H 1/00
2021/0114477 A1\* 4/2021 Montousse ............ B60N 2/646

FOREIGN PATENT DOCUMENTS

KR 10-2018-0100973 A 9/2018
WO 2019/003334 A1 1/2019

\* cited by examiner

VEHICLE CONNECTED TO BUILDING AND VEHICLE-BUILDING CONNECTION SYSTEM

CROSS REFERENCE TO RELATED APPLICATION

The present application claims priority to Korean Patent Application No. 10-2019-0047111, filed on Apr. 23, 2019 in the Korean Intellectual Property Office, the entire contents of which is incorporated herein for all purposes by this reference.

TECHNICAL FIELD

The present disclosure relates to a vehicle connected to a building and a vehicle-building connection system by which the vehicle and the building are physically and electrically connected to each other, exchange energy therebetween, and perform docking to exchange information therebetween.

BACKGROUND

Recently, as interest in electric vehicles and autonomous vehicles becomes higher, various uses and forms thereof have been developed together. In the case of an autonomous vehicle, a passenger is capable of performing activities as desired, and connectivity of a vehicle to various other environments has become important, and thus, connectivity to an infrastructure via a communication function is expected to be enhanced in the case of construction of a smart city or the like.

Accordingly, when a vehicle and a living space are connected to each other to connect the vehicle to a building, the concept of use of the indoor space of the vehicle as an extension of a living space may be considered.

However, there has been no conventional proposal for extension of a space via such connection between a vehicle and a building, and accordingly, there is no concept of charging a vehicle or using vehicular power in an emergency situation of a building via exchange of power between a vehicle and a building in the case of connection of space thereof.

The contents described as the related art have been provided only to assist in understanding the background of the present disclosure and should not be considered as corresponding to the related art known to those having ordinary skill in the art.

SUMMARY

An object of the present disclosure is to provide a vehicle connected to a building and a vehicle-building connection system by which the vehicle and the building are physically and electrically connected to each other, exchange energy therebetween, and perform docking to exchange information therebetween.

According to an exemplary embodiment of the present disclosure, a vehicle connected to a building includes: a door configured to connect an indoor space of the vehicle and an indoor space of the building to each other as one space when the vehicle is connected to an entrance of the building in a state in which the door is open; a vehicle energy storage unit configured to supply driving energy of the vehicle; a vehicle energy connection unit electrically connected to an energy supply unit of the building and configured to exchange energy between the building and the vehicle energy storage unit; a data connection unit connected to a communication unit of the building and configured to transmit and receive data to and from the building; and a vehicle controller configured to control the door according to an access level with the building to execute any one or more of a connection mode of connecting the door to the entrance of the building, an energy mode of exchanging energy between the building and the vehicle energy storage unit through the vehicle energy connection unit, or a data mode of transmitting and receiving data to and from the building through the data connection unit.

The vehicle energy storage unit may be a high-voltage battery module installed in the vehicle.

The vehicle energy connection unit may be a power connector or a wireless power transceiver module.

The vehicle energy connection unit may be a power connector coupled to a connector module of the building disposed at a lateral side of the building that the vehicle faces.

The vehicle energy connection units may be provided at opposite lateral sides of the vehicle, a vehicle energy connection unit at one lateral side may be electrically connected to the energy supply unit of the building, and a vehicle energy connection unit at a remaining lateral side may be electrically connected to another vehicle to exchange energy between the other vehicle and the energy supply unit of the building.

The vehicle energy connection unit may be a wireless power transceiver module provided on an underside of the vehicle, a lateral side of the vehicle that the building faces, or a roof of the vehicle.

The data connection unit may be connected to the vehicle controller and may be a data connector or a wireless communication module.

The data connection unit may be a data connector coupled to a connector module of the building disposed at a lateral side of the building that the vehicle faces.

When the access level is level 1, the vehicle controller may execute all of the connection mode, the energy mode, and the data mode, and may assign control over the vehicle to the building.

When the access level is level 2, the vehicle controller may execute the connection mode and the energy mode, when the access level is level 3, the vehicle controller may execute the connection mode, and when the access level is level 4, the vehicle controller may execute the energy mode.

When the vehicle controller is in the energy mode, the vehicle energy storage unit may be charged with energy from a building energy supply unit through the vehicle energy connection unit.

When the vehicle controller is in the energy mode, if a supply capability of the building energy supply unit is equal to or less than a predetermined reference and an amount of energy stored in the vehicle energy storage unit is equal to or greater than a predetermined reference, the vehicle energy storage unit may supply energy to the building energy supply unit through the vehicle energy connection unit.

When the vehicle controller is in the energy mode, if a supply capability of the building energy supply unit is equal to or less than a predetermined reference, an energy consumption of the building is equal to or less than a predetermined reference, and an amount of energy stored in the vehicle energy storage unit is equal to or greater than a predetermined reference, the vehicle energy storage unit may supply energy to the building energy supply unit through the vehicle energy connection unit.

According to another exemplary embodiment of the present disclosure, a vehicle-building connection system includes: a building entrance configured to connect an indoor space of a vehicle and an indoor space of the building to each other as one space when the building entrance is connected to a vehicle door in a state in which the building entrance is open; a building energy connection unit located in the building and connected to a vehicle energy connection unit to exchange energy with a vehicle energy storage unit; a building communication unit located in the building and connected to a data connection unit to transmit and receive data to and from the vehicle; and a building controller configured to control the building entrance according to an access level of the vehicle and to execute any one or more of a connection mode of connecting the building entrance to the door of the vehicle, an energy mode of exchanging energy between the building and the vehicle energy storage unit through the building energy connection unit, or a data mode of transmitting and receiving data to and from the vehicle through the building communication unit.

The vehicle-building connection system may further include a parking space provided next to the building to enable the vehicle to be parked.

The building energy connection unit may be a wireless power transceiver module and may be provided at a lateral side of the building that the vehicle faces or on a floor of the parking space or may be provided on a ceiling of the parking space to face a roof of the vehicle.

DETAILED DESCRIPTION OF THE EMBODIMENTS

Figure 1:
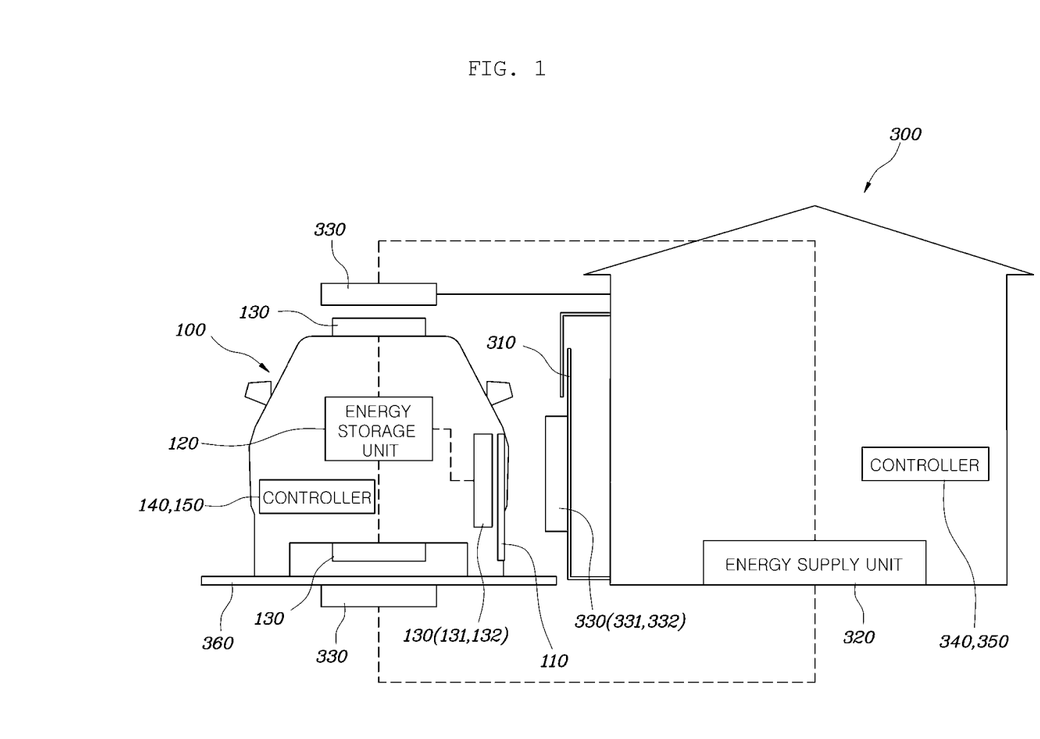
FIG. 1 is a diagram showing a vehicle connected to a building and a vehicle-building connection system according to an exemplary embodiment of the present disclosure.
Figure 2:
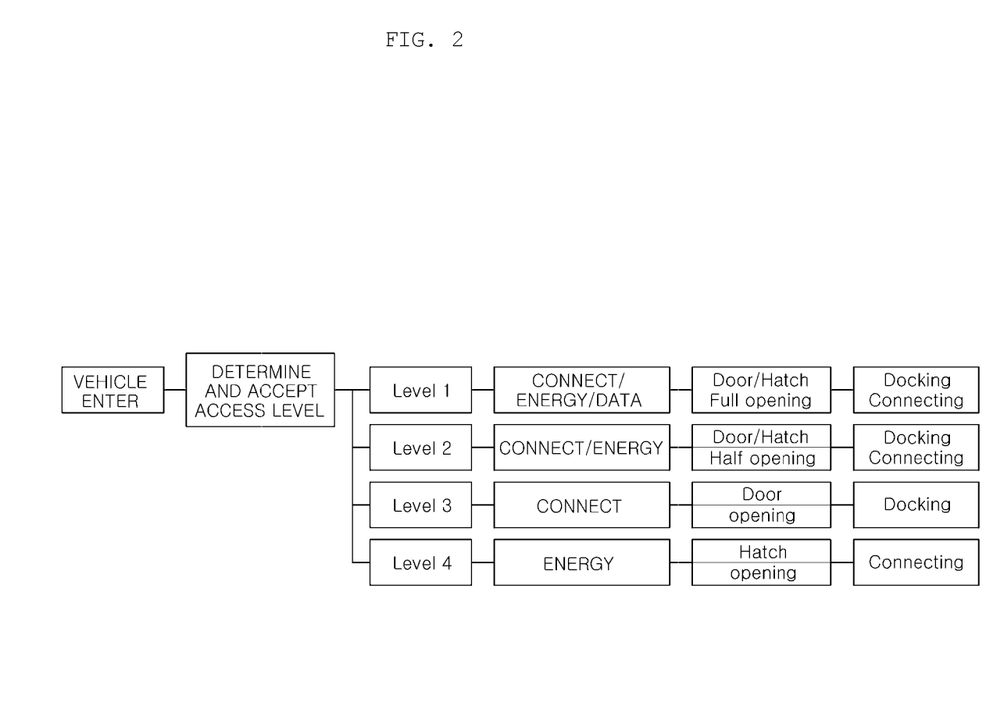
FIG. 2 is a diagram for explanation of control of a vehicle connected to a building and a vehicle-building connection system according to an exemplary embodiment of the present disclosure.
Figure 3:
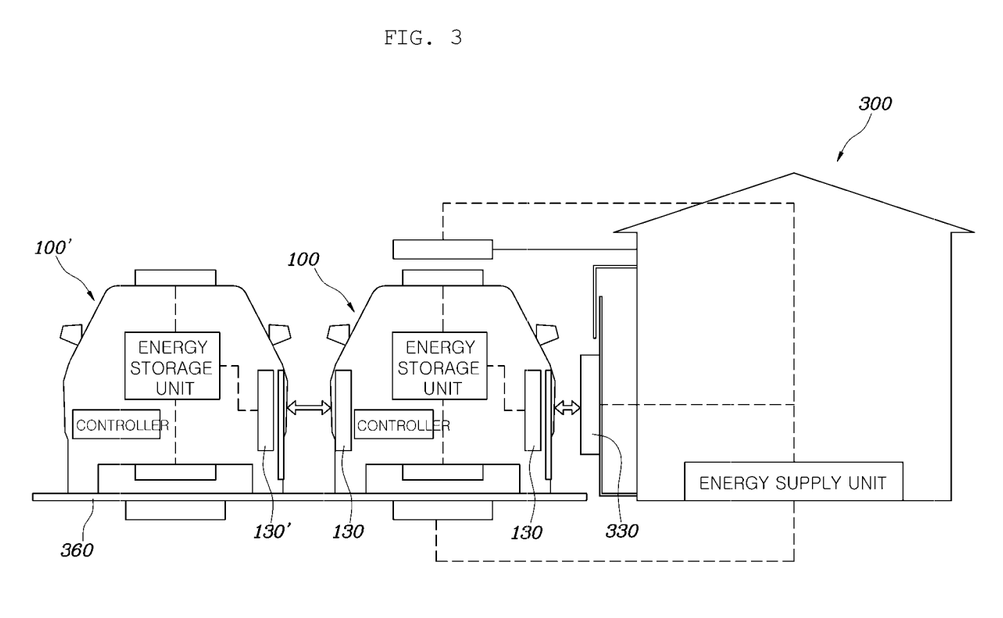
FIG. 3 is a diagram showing a vehicle connected to a building and a vehicle-building connection system according to another exemplary embodiment of the present disclosure.
Figure 4:
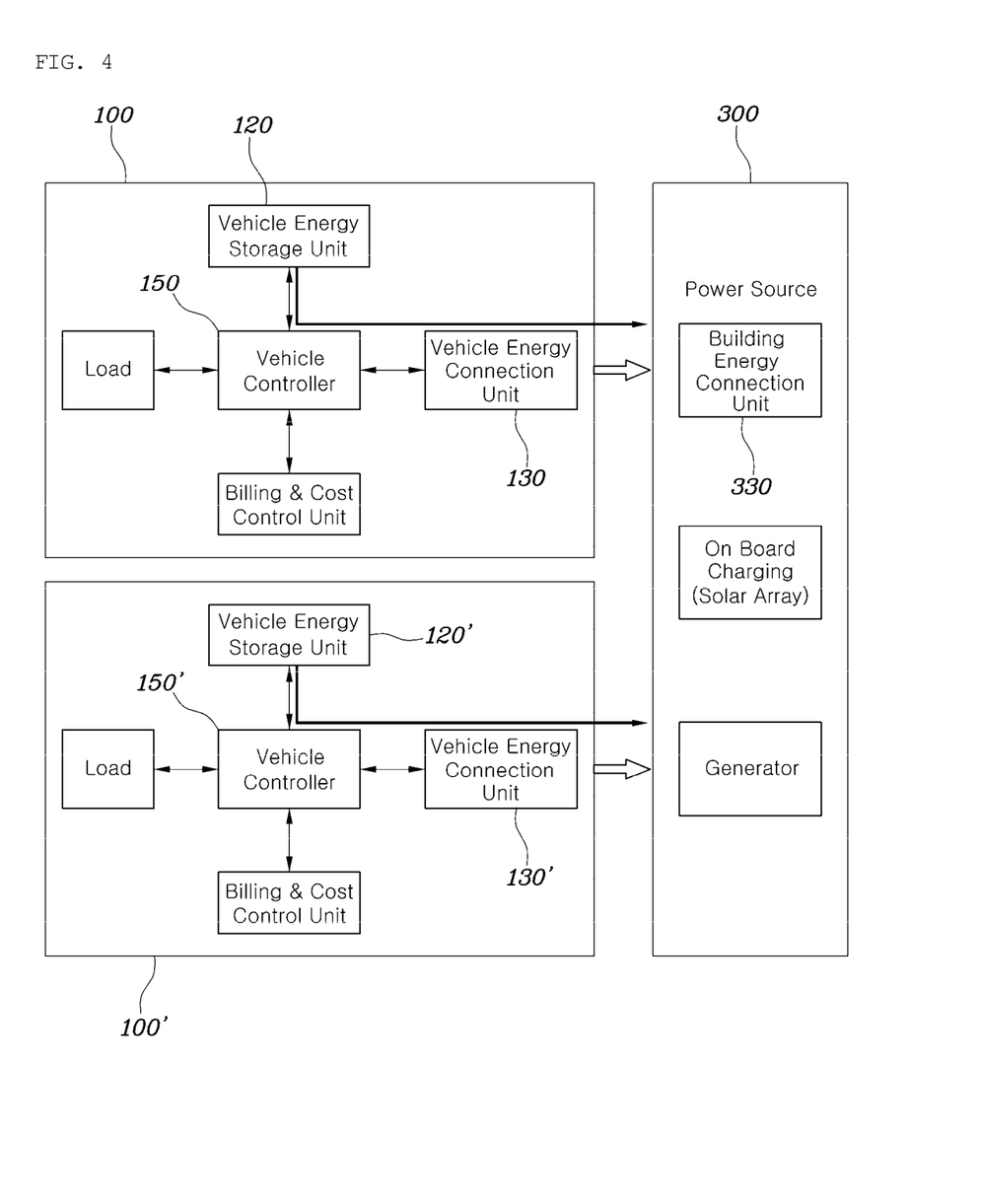
FIGS. 4 to 6 are diagrams showing a charging method of the vehicle and the vehicle-building connection system that are shown in FIG. 3.
Figure 5:
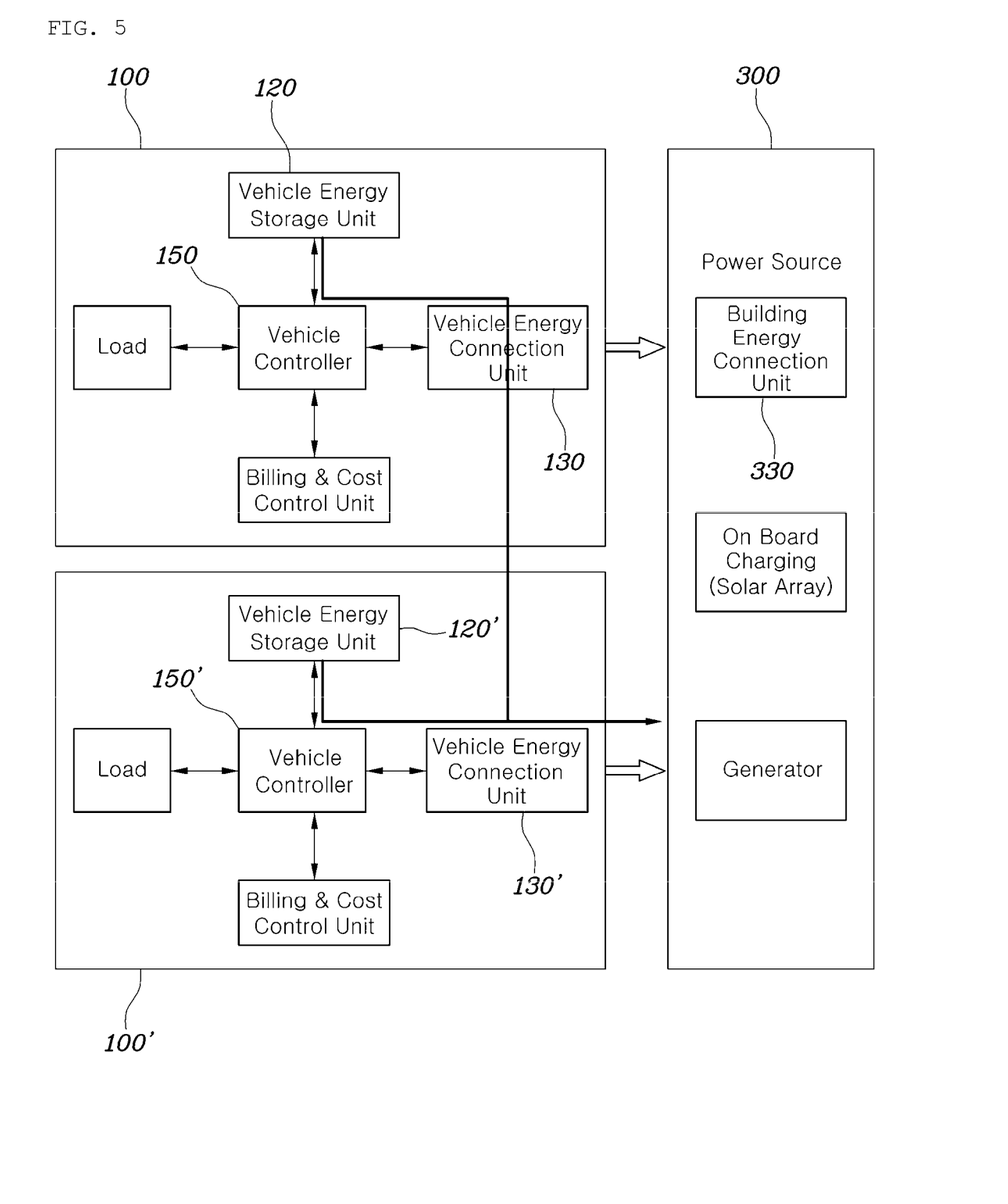
Figure 6:
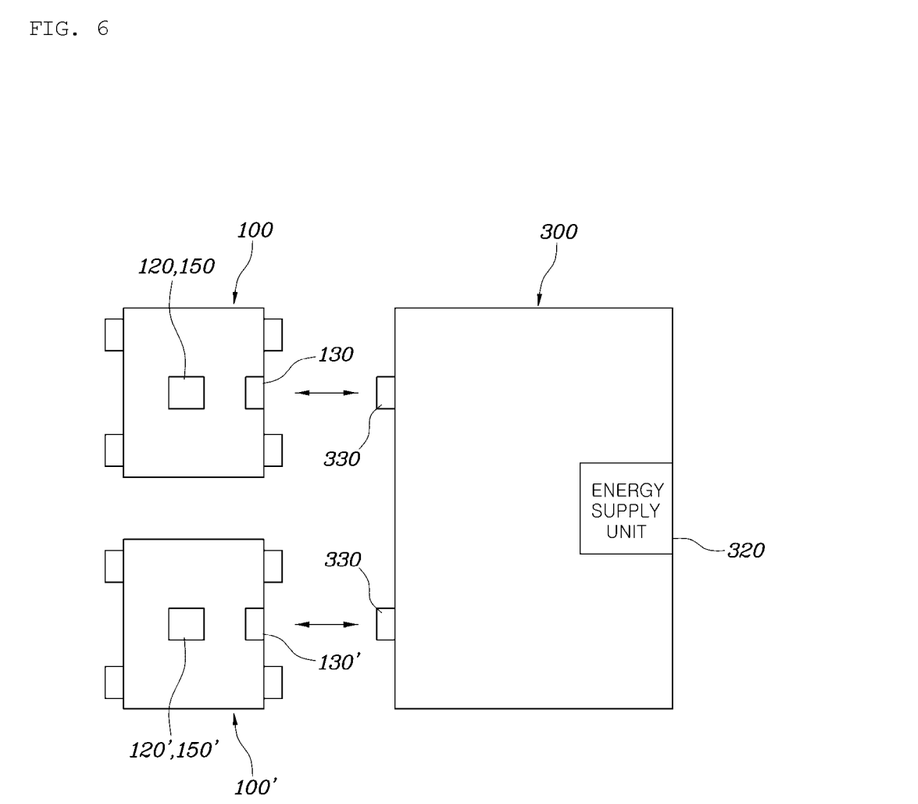

FIG. 1 is a diagram showing a vehicle connected to a building and a vehicle-building connection system according to an exemplary embodiment of the present disclosure. FIG. 2 is a diagram for explanation of control of a vehicle connected to a building and a vehicle-building connection system according to an exemplary embodiment of the present disclosure. FIG. 3 is a diagram showing a vehicle connected to a building and a vehicle-building connection system according to another exemplary embodiment of the present disclosure. FIGS. 4 to 6 are diagrams showing a charging method of the vehicle and the vehicle-building connection system that are shown in FIG. 3.

The vehicle connected to the building according to the present disclosure may include: a door 110 for connecting an indoor space of a vehicle 100 and an indoor space of a building 300 to each other as one space when the vehicle is connected to an entrance 310 of the building 300 in the state in which the door 110 is open, a vehicle energy storage unit 120 for supplying driving energy of the vehicle, a vehicle energy connection unit 130 that is electrically connected to an energy supply unit 320 of the building and exchanges energy between the building and the vehicle energy storage unit 120, a data connection unit 140 connected to a building communication unit 340 of the building to transmit and receive data to and from the building, and a vehicle controller 150 for controlling the door 110 according to an access level with the building to execute any one or more of a connection mode of connecting the door 110 to the entrance of the building, an energy mode of exchanging energy between the building and the vehicle energy storage unit 120 through the vehicle energy connection unit 130, or a data mode of transmitting and receiving data to and from the building through the data connection unit 140.

The vehicle controller 150 according to an exemplary embodiment of the present disclosure may be embodied using a non-volatile memory (not shown) configured to store data about an algorithm configured to control the operation of various components of the vehicle or data about software commands for reproducing the algorithm, and a processor (not shown) configured to perform the following operations using the data stored in the corresponding memory. Here, the memory and the processor may be embodied in separate chips. Alternatively, the memory and the processor may be embodied in a single integrated chip. The processor may be configured in the form of one or more processors.

As shown in FIG. 1, the vehicle according to the present disclosure may be physically connected to the building to perform docking on the respective spaces. This feature of the present disclosure proposes a concept of extending an indoor space of a vehicle to a building, in particular, a living space to form one additional room.

An electric vehicle is capable of sharing power with a building, and accordingly when a driver parks the vehicle at his or her house, the space thereof may be extended, and simultaneously the vehicle may be advantageously charged. Air conditioning, indoor lighting, audio, or the like may also be integrated and managed, and a driver allows another vehicle to be parked at his or her house and to be charged in his or her house, and accordingly the present disclosure corresponds to a platform by which a new private business model is proposed.

In detail, in order to configure such a platform, the vehicle according to the present disclosure may include the door 110, the vehicle energy storage unit 120, the vehicle energy connection unit 130, the data connection unit 140, and the vehicle controller 150. When the door 110 is connected to the entrance 310 of the building in the state in which the door 110 is open, the indoor space of the vehicle and the indoor space of the building may be connected to each other as one space. The door 110 may be configured using various methods such as a sliding method or a gull wing door method, and may be configured using any method as long as the indoor space of the vehicle is connected to the entrance 310 of the building.

The vehicle may include the vehicle energy storage unit 120 for supplying driving energy of the vehicle. In the case of an electric vehicle, the vehicle energy storage unit 120 may be a high-voltage battery, and in the case of a hydrogen fuel cell vehicle, the vehicle energy storage unit 120 may be a hydrogen tank or the like. That is, the vehicle energy storage unit 120 may be a high-voltage battery module installed in the vehicle.

The energy supply unit 320 for supplying electricity, hydrogen, or the like may also be provided in the building, and the vehicle energy connection unit 130 of the vehicle may be electrically connected to the energy supply unit 320 to exchange energy between the building and the vehicle energy storage unit 120. To this end, the vehicle energy connection unit 130 may be a power connector 131 or a wireless power transceiver module 132. When the energy is electrical energy, the vehicle energy connection unit 130 may be configured in the form of a physical connector or a wireless power transceiver module such as a wirelessly chargeable pad, and when energy is hydrogen, the vehicle energy connection unit 130 may be configured in the form of a connector that is capable of exchanging hydrogen.

The vehicle may include the data connection unit 140 connected to the communication unit 340 to transmit and receive data to and from the building. A controller of the vehicle and a controller of the building may be connected to each other through the data connection unit 140 to control each other. As such, temperature, audio, a door, or the like of the vehicle or the building may be integrated and controlled.

In detail, as shown in FIG. 1, the vehicle energy connection unit 130 may be the power connector 131 coupled to a connector module 331 of the building disposed at a lateral side of the building that the vehicle faces. As shown in FIG. 1, the vehicle energy connection unit 130 may be a wireless power transceiver module provided on an underside of the vehicle, a lateral side of the vehicle that the building faces, or a roof of the vehicle.

The data connection unit 140 may be connected to the vehicle controller 150 or may be integrated therewith as shown in the drawing. When the data connection unit 140 and the controller 150 are separately provided, the data connection unit 140 may be configured in the form of a data connector 132, and when the data connection unit 140 and the controller 150 are integrated therewith, the data connection unit 140 may be configured in the form of a wireless communication module 140. The data connection unit 140 may be the data connector 132 coupled to a connector module 332 disposed at a lateral side of the building that the vehicle faces. When the data connection unit 140 is configured in the form of a connector, the data connection unit 140 may be integrated with the power connector 131, as shown in the drawing.

The vehicle controller 150 may control the door according to an access level with the building to execute any one or more of a connection mode of connecting the door to the entrance of the building, an energy mode of exchanging energy between the building and the vehicle energy storage unit 120 through the vehicle energy connection unit 130, or a data mode of transmitting and receiving data to and from the building through the data connection unit 140.

That is, when a vehicle approaches a building, the vehicle controller 150 and a building controller 350 may communicate with each other to read an access level of the corresponding vehicle. When the access level is read, a level of a mode to be executed based on the read access level may be determined.

FIG. 2 is a diagram for explanation of control of a vehicle connected to a building and a vehicle-building connection system according to an exemplary embodiment of the present disclosure. When an access level is level 1, the vehicle controller 150 may execute all of a connection mode, an energy mode, and a data mode, and when the vehicle controller 150 executes the data mode, the vehicle controller 150 may assign control over the vehicle to the building. In the case of a connection mode in level 1, both the door of the vehicle and the entrance of the building may be open and may be connected to each other to perform docking and to transmit and receive power and data.

When the access level is level 2, the vehicle controller 150 may execute the connection mode and the energy mode and may perform docking, but may perform only charging without transmission and reception of data. In addition, when the access level is level 3, only the connection mode may be executed and only docking may be performed, and when the access level is level 4, only the energy mode may be executed and only charging may be performed. When the connection mode is executed, the spaces may be entirely open and connected to each other or may be open only halfway and connected by a small degree.

The aforementioned access levels may be defined as various situations. For example, level 1 may be defined as the case of a vehicle of a person who actually resides in a building or actually owns the building, or a vehicle owned by the person, level 2 may be defined as the case of a person or a vehicle that is allowed by a resident, level 3 may be defined as the case of a person or a vehicle that needs to temporally access the building and is allowed to access the same, and level 4 may be defined as the case of a third person or a vehicle thereof that needs only charging and is not allowed to access the building.

When the vehicle controller 150 is in an energy mode, the vehicle energy storage unit 120 may be charged with energy from the building energy supply unit 320 through the vehicle energy connection unit 130. That is, it may be possible to charge an electric vehicle.

In particular, when the vehicle controller 150 is an in an energy mode, if the supply capability of the building energy supply unit 320 is equal to or less than a predetermined reference and the amount of energy stored in the vehicle energy storage unit 120 is equal to or greater than a predetermined reference, the vehicle energy storage unit 120 may supply energy to the building energy supply unit 320 through the vehicle energy connection unit 130. That is, in this case, when the supply of electricity to the building is disconnected due to a disaster or the like, the electrical energy charged in the vehicle energy storage unit 120 may be supplied to the building to enable the building to be driven. This may be possible only in a predetermined condition in which the supply capability of the building energy supply unit 320 is equal to or less than a predetermined reference and the amount of energy stored in the vehicle energy storage unit 120 is equal to or greater than a predetermined reference, and accordingly both the vehicle and the building may be stably managed.

When the vehicle controller 150 is in an energy mode, if the supply capability of the building energy supply unit 320 is equal to or less than a predetermined reference, the energy consumption of the building is equal to or less than a predetermined reference, and the amount of energy stored in the vehicle energy storage unit 120 is equal to or greater than a predetermined reference, the vehicle energy storage unit 120 may supply energy to the building energy supply unit 320 through the vehicle energy connection unit 130. This is because only power in an emergency situation may be provided by supplying power of the vehicle only when the energy consumption of the building is equal to or less than a predetermined reference.

In addition, a vehicle-building connection system according to the present disclosure may include the building entrance 310 provided in a building and configured to connect an indoor space of a vehicle and an indoor space of the building to each other as one space when the building entrance is connected to a vehicle door in the state in which the building entrance is open, a building energy connection unit 330 provided in the building and connected to the vehicle energy connection unit 130 to exchange energy with the vehicle energy storage unit 120, a building communication unit 340 provided in the building, connected to the data connection unit 140, and configured to transmit and receive data to and from the vehicle, and the building controller 350 configured to control the entrance according to an access level of the vehicle and to execute any one or more of a connection mode of connecting the entrance to the door of the vehicle, an energy mode of exchanging energy between the building and the vehicle energy storage unit 120 through the building energy connection unit 330, or a data mode of transmitting and receiving data to and from the vehicle through the building communication unit 340.

The vehicle-building connection system may further include a parking space 360 provided next to the building to enable a vehicle to be parked. The building energy connection unit 330 may be a wireless power transceiver module and may be provided at a lateral side of the building that the vehicle faces or on a floor of the parking space or may be provided on a ceiling of the parking space to face a roof of the vehicle.

FIG. 3 is a diagram showing a vehicle connected to a building and a vehicle-building connection system according to another exemplary embodiment of the present disclosure. In this case, two vehicles 100 and 100' including another vehicle 100' are connected to the building 300. In this case, the energy connection unit 130 of one side of the vehicle 100 may be connected to the building and may perform charging. The energy connection unit 130 of a remaining side of the vehicle 100 may be connected to an energy connection unit 130' of another vehicle, and thus the vehicle 100 and the other vehicle 100' according to the present disclosure may be connected together in series to the building. In this case, the other vehicle 100' may indirectly exchange electrical energy with the energy supply unit 320 of the building through the vehicle 100 according to the present disclosure.

In addition, the two vehicles may be continuously connected to a physical space to share the physical space with the building or only the vehicle close to the building may be spatially connected to the building.

FIGS. 4 to 6 are diagrams showing a charging method of the vehicle and the vehicle-building connection system that are shown in FIG. 3. The drawings show a charging method in the case of connection as in FIG. 3. FIG. 4 shows the case of parallel connection, in which case energy connection units 130 and 130' of the respective vehicles may be connected in parallel to the energy connection unit 330 of the building. For such parallel connection, each vehicle may be connected to the building as shown in FIG. 6. FIG. 6 shows the state in which the vehicles 100 and 100' are parked in parallel to each other at a lateral side of the building 300 and the vehicles 100 and 100' are connected to the building 300 via wireless charging and are connected in parallel to the building 300.

FIG. 5 shows the case of series connection and shows the case in which the vehicle and the energy connection units 130 and 130' are connected to each other and are connected in series to the building energy connection unit 330.

For such complicated and various connections, a wireless power transceiver module may be provided in a vehicle and at a lateral side of a building and data may be exchanged through a wireless communication module. This is because this case is very effective in terms of connectivity in that all of two or more vehicles or a plurality of buildings are connected to each other as one component.

In the vehicle connected to the building and the vehicle-building connection system according to the present disclosure, the vehicle and the building may be physically and electrically connected to each other, may exchange energy therebetween, and may perform docking to exchange information therebetween.

In the vehicle connected to the building and the vehicle-building connection system according to the present disclosure, the vehicle and the building may be physically and electrically connected to each other, may exchange energy therebetween, and may perform docking to exchange information therebetween.

Accordingly, the aforementioned embodiments are exemplary in all aspects and are understood not to be limited. The scope of the present disclosure is defined by the following claims but not the above description and the meaning and scope of the claims and all modifications or modified forms from equivalents thereof are within the scope of the present disclosure.

What is claimed is:

1. A vehicle connected to a building, comprising:
   a door configured to connect an indoor space of the vehicle and an indoor space of the building to each other as one space when the vehicle is connected to an entrance of the building in a state in which the door is open;
   a vehicle energy storage unit configured to supply driving energy of the vehicle;
   a vehicle energy connection unit electrically connected to an energy supply unit of the building and configured to exchange energy between the building and the vehicle energy storage unit;
   a data connection unit connected to a communication unit of the building and configured to transmit and receive data to and from the building; and
   a vehicle controller configured to control the door according to an access level with the building to execute any one or more of a connection mode of connecting the door to the entrance of the building, an energy mode of exchanging energy between the building and the vehicle energy storage unit through the vehicle energy connection unit, or a data mode of transmitting and receiving data to and from the building through the data connection unit.

2. The vehicle of claim 1, wherein the vehicle energy storage unit is a high-voltage battery module installed in the vehicle.

3. The vehicle of claim 1, wherein the vehicle energy connection unit is a power connector or a wireless power transceiver module.

4. The vehicle of claim 1, wherein the vehicle energy connection unit is a power connector coupled to a connector module of the building disposed at a lateral side of the building that the vehicle faces.

5. The vehicle of claim 1, wherein the vehicle energy connection units are arranged at opposite lateral sides of the vehicle, a vehicle energy connection unit at one lateral side is electrically connected to the energy supply unit of the building, and a vehicle energy connection unit at a remaining lateral side is electrically connected to another vehicle to exchange energy between the other vehicle and the energy supply unit of the building.

6. The vehicle of claim 1, wherein the vehicle energy connection unit is a wireless power transceiver module arranged on an underside of the vehicle, a lateral side of the vehicle that the building faces, or a roof of the vehicle.

7. The vehicle of claim 1, wherein the data connection unit is connected to the vehicle controller and is a data connector or a wireless communication module.

8. The vehicle of claim 1, wherein the data connection unit is a data connector coupled to a connector module of the building disposed at a lateral side of the building that the vehicle faces.

9. The vehicle of claim 1, wherein, when the access level is level 1, the vehicle controller executes all of the connection mode, the energy mode, and the data mode, and assigns control over the vehicle to the building.

10. The vehicle of claim 1, wherein, when the access level is level 2, the vehicle controller executes the connection mode and the energy mode, when the access level is level 3, the vehicle controller executes the connection mode, and when the access level is level 4, the vehicle controller executes the energy mode.

11. The vehicle of claim 1, wherein, when the vehicle controller is in the energy mode, the vehicle energy storage unit is charged with energy from the energy supply unit of the building through the vehicle energy connection unit.

12. The vehicle of claim 1, wherein, when the vehicle controller is in the energy mode, if a supply capability of the energy supply unit of the building is equal to or less than a predetermined reference and an amount of energy stored in the vehicle energy storage unit is equal to or greater than a predetermined reference, the vehicle energy storage unit supplies energy to the energy supply unit of the building through the vehicle energy connection unit.

13. The vehicle of claim 1, wherein, when the vehicle controller is in the energy mode, if a supply capability of the energy supply unit of the building is equal to or less than a predetermined reference, an energy consumption of the building is equal to or less than a predetermined reference, and an amount of energy stored in the vehicle energy storage unit is equal to or greater than a predetermined reference, the vehicle energy storage unit supplies energy to the energy supply unit of the building through the vehicle energy connection unit.

14. A vehicle-building connection system, comprising:
a building entrance configured to connect an indoor space of a vehicle and an indoor space of a building to each other as one space when the building entrance is connected to a vehicle door in a state in which the building entrance is open;
a building energy connection unit located in the building and connected to a vehicle energy connection unit of the vehicle to exchange energy with a vehicle energy storage unit;
a building communication unit located in the building and connected to a vehicle data connection unit to transmit and receive data to and from the vehicle; and
a building controller configured to control the building entrance according to an access level of the vehicle and to execute any one or more of a connection mode of connecting the building entrance to the door of the vehicle, an energy mode of exchanging energy between the building and the vehicle energy storage unit through the building energy connection unit, or a data mode of transmitting and receiving data to and from the vehicle through the building communication unit.

15. The vehicle-building connection system of claim 14, further comprising:
a parking space located next to the building for the vehicle.

16. The vehicle-building connection system of claim 15, wherein the building energy connection unit is a wireless power transceiver module and is arranged at a lateral side of the building that the vehicle faces or on a floor of the parking space, or is located on a ceiling of the parking space to face a roof of the vehicle.

* * * * *